(12) United States Patent
Li et al.

(10) Patent No.: US 12,499,352 B2
(45) Date of Patent: Dec. 16, 2025

(54) ANOMALY DETECTION WITH DYNAMIC DENSITY ESTIMATION

(71) Applicant: Hong Kong Applied Science and Technology Research Institute Company Limited, Hong Kong (CN)

(72) Inventors: Peiqin Li, Hong Kong (CN); Jiayu Shu, Wuxi (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 500 days.

(21) Appl. No.: 18/156,490

(22) Filed: Jan. 19, 2023

(65) Prior Publication Data

US 2024/0249119 A1 Jul. 25, 2024

(51) Int. Cl.
*G06N 3/0464* (2023.01)
*G06N 3/08* (2023.01)
*G06T 7/00* (2017.01)

(52) U.S. Cl.
CPC ............. *G06N 3/0464* (2023.01); *G06N 3/08* (2013.01); *G06T 7/0004* (2013.01);
(Continued)

(58) Field of Classification Search
CPC ........ G06N 3/0464; G06N 3/08; G06N 3/045; G06N 3/084; G06N 3/02; G06N 3/09;
(Continued)

(56) References Cited

U.S. PATENT DOCUMENTS 9,964,607 B1 * 5/2018 Propes ................. G06V 10/454
10,410,135 B2 * 9/2019 Shumpert .............. G06N 20/00
11,410,033 B2 * 8/2022 Neves ..................... G06N 3/084

FOREIGN PATENT DOCUMENTS

CN 108345911 A 7/2018
CN 110555467 A 12/2019
(Continued)

OTHER PUBLICATIONS

Medera, D. and Babinec, Š. (2009). Incremental Learning of Convolutional Neural Networks. In Proceedings of the International Joint Conference on Computational Intelligence (IJCCI 2009)—ICNC; ISBN 978-989-674-014-6; ISSN 2184-3236, SciTePress, pp. 547-550. DOI: 10.5220/0002316405470550 (Year: 2009).*

(Continued)

*Primary Examiner* — Jeffrey P Aiello
(74) *Attorney, Agent, or Firm* — S&F/WEHRW

(57) ABSTRACT

In detecting anomaly in samples, convolutional neural network (CNN) and machine-learning classifier modelled with support vectors are used. The CNN and classifier are initially trained with normal samples, and incrementally trained in retraining sessions each with self-generated anomalous samples identified in inference preceding a retraining session under consideration, thereby continually improving the anomaly-detection performance without a need to seek anomalous samples for initializing the CNN and classifier. The support vectors are selected as feature k-centers of output feature map of the CNN. Dynamic density estimation is used to determine which feature k-centers in existing support vector set are retainable in updating the support vector set in the retraining session. As such, not all feature k-centers need to be recomputed to give the support vectors in the updated support vector set. Computation effort in updating the support vector set is reduced in comparison to generating this set from scratch.

16 Claims, 6 Drawing Sheets

(52) U.S. Cl.
CPC ............... *G06T 2207/20081* (2013.01); *G06T 2207/20084* (2013.01); *G06T 2207/30108* (2013.01)

(58) Field of Classification Search
CPC ........ G06N 3/096; G06N 3/049; G06N 3/043; G06N 3/088; G06N 3/044; G06N 3/042; G06N 20/00; G06N 20/10; G06T 2207/20081; G06T 2207/20084; G06T 2207/30108; G06T 2207/20076; G06T 9/004; G05B 19/4183; G05B 19/41875
USPC ................................ 702/189; 706/14, 16, 18
See application file for complete search history.

(56) References Cited

FOREIGN PATENT DOCUMENTS

| CN | 112270334 A | * | 1/2021 | ........... G06F 18/214 |
| CN | 114581388 A | | 6/2022 | |
| CN | 114898158 A | * | 8/2022 | ............. G06N 3/044 |
| CN | 115456932 A | * | 12/2022 | ............. G06N 3/091 |
| EP | 3879356 A1 | * | 9/2021 | ......... G06F 18/2415 |

OTHER PUBLICATIONS

Liu, Jianyu et al. "A two-stage anomaly detection framework: Towards low omission rate in industrial vision applications", Advanced Engineering Informatics, Dec. 14, 2022.

\* cited by examiner

ANOMALY DETECTION WITH DYNAMIC DENSITY ESTIMATION

TECHNICAL FIELD

The present disclosure generally relates to an anomaly detection technique for detecting unusual patterns or data points that do not conform to an expected distribution. Particularly, the present invention relates to such technique that can continually improve an anomaly-detection performance when more abnormal or anomalous data are available, that addresses the cold-start problem and that can evolve gradually when more and more abnormal examples are given.

BACKGROUND

Anomaly detection is concerned with identifying anomalies, which are unusual patterns or data points that do not conform to an expected distribution. One approach that has gained popularity in the industry is to apply machine-learning techniques in anomaly detection. Since abnormal data are very rare in most of practical anomaly-detection scenarios, machine-learning models are usually learnt with normal data, sometimes with additional small amount of abnormal data. It leads to a poor anomaly-detection performance due to lacking training data variety. Apart from the poor performance, it also leads to other problems such as a low detection speed due to poor memory efficiency in computer implementation of the machine-learning techniques, and lacking the ability to continuously improve the anomaly-detection performance. There is a need in the art for an improved machine-learning technique that addresses the aforementioned technical problems.

The technique has many industrial applications, particularly in the area of testing articles manufactured in a production line. Solving the problem of poor anomaly-detection performance enables the technique to be more-effectively used in testing and quality control of manufactured articles. Addressing the problem of low detection speed enables the technique to accelerate the product testing. Possessing the ability of continuously improving the anomaly-detection performance allows the testing and quality control to be self-adaptive or individualized to characteristics of the manufactured articles.

SUMMARY

An aspect of the present disclosure is to provide a computer-implemented method for detecting sample anomaly in a plurality of samples.

In the method, the plurality of samples is processed for anomaly detection in an inference stage. A cold-start stage preceding the inference stage is inserted. The inference stage is divided into a plurality of inference-stage sessions. A retraining session is inserted between any two successive inference-stage sessions. In the inference stage, a convolutional neural network (CNN) is used to extract features of an individual sample to thereby generate a feature map. A machine-learning classifier modelled with one or more support vector sets is used to process the feature map to determine if the individual sample is anomalous. In the cold-start stage, the one or more support vector sets are initialized according to an initial training set of feature maps generated from processing a set of normal samples with the CNN after the CNN is pretrained. In the retraining session, the CNN is finetuned according to at least an interim set of self-generated anomalous samples identified during an inference-stage session immediately preceding the retraining session. The one or more support vector sets are updated according to an intermediate training set of feature maps generated from processing the set of normal samples with the CNN after the CNN is finetuned. It thereby allows an anomaly-detection performance to be continually improved due to introducing newly-identified self-generated anomalous samples in incrementally training the CNN and classifier while avoiding a need for seeking an initial training set of anomalous samples for initializing the CNN and classifier in the cold-start stage.

In the cold-start stage, preferably a first plurality of feature k-centers is generated from extracted features in the initial training set of feature maps. Respective support vectors in the initialized one or more support vector sets are selected from the first plurality of feature k-centers.

Although in the retraining session, the one or more support vector sets may be determined directly from the intermediate training set of feature maps by using a k-center algorithm as in the cold-start stage, it is more preferable to utilize a knowledge of existing support vectors in updating the one or more support vector sets from the intermediate training set of feature maps for reducing computation. As such, dynamic density estimation for selecting feature k-centers dynamically to represent normal data is disclosed. According to the dynamic density estimation, whether an individual support vector in the one or more support vector sets is no longer a feature k-center is first determined according to the intermediate training set of feature maps. As a result, respective support vectors in the one or more support vector sets are divided into retainable support vectors and discardable support vectors for updating the one or more support vector sets. A second plurality of feature k-centers is then generated from extracted features in the intermediate training set of feature maps under a condition that the retainable support vectors are in the second plurality of feature k-centers. It thereby reduces computation effort in comparison to generating the second plurality of feature k-centers from scratch. Finally, respective support vectors in the updated one or more support vector sets are selected from the second plurality of feature k-centers. It is preferable that the entire second plurality of feature k-centers is fully utilized in forming the respective support vectors for avoiding wasting some computation effort in generating the second plurality of feature k-centers.

In certain embodiments, each of the first and second pluralities of feature k-centers is obtained by using a greedy k-center algorithm.

In certain embodiments, the one or more support vector sets consist of multiple support vector sets, where an individual support vector set collects respective support vectors located on a preselected region of the feature map, and respective preselected regions for the multiple support vector sets are non-overlapping. Additionally, in the inference stage, the feature map is processed with each of the multiple support vector sets for determining any location on the individual sample where anomaly occurs.

In certain embodiments, the one or more support vector sets consist of a single support vector set.

In certain embodiments, the CNN includes an averaging pooling layer such that the feature map is reduced to a feature vector. Furthermore, the one or more support vector sets consist of a single support vector set.

In the cold-start stage, the CNN may be pretrained by loading pre-stored CNN model parameters into the CNN.

In the retraining session, the finetuning of the CNN may comprises: augmenting the set of normal samples with the interim set of self-generated anomalous samples by copying selected anomalous portions of respective anomalous samples in the interim set of self-generated anomalous samples onto one or more normal samples in the set of normal samples, thereby creating a set of synthetic training samples for enriching training set variety in finetuning the CNN; and updating model parameters of the CNN according to the set of synthetic training samples by performing multiple iterations of optimizing the model parameters to minimize a loss function in each iteration and by using a center loss and a diversity loss alternately and recursively as the loss function over the iterations of model parameter optimization.

Embodiments of the disclosed method are developed for the specific case that the individual sample is an image. In this case, usually the CNN is implemented with a two-dimensional convolution operation. An individual anomalous sample in the set of anomalous samples may be pixelwise labelled manually to increase CNN model accuracy. Under such circumstance, an individual synthetic training sample is also pixelwise labelled automatically.

In certain embodiments, the individual sample is an image, and the finetuning of the CNN further comprises receiving the interim set of self-generated anomalous samples in which an individual anomalous sample is pixelwise labelled for increasing CNN model accuracy in retraining the CNN.

In certain embodiments, the classifier adopts an L2 distance as a criterion in classification.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

The present disclosure is concerned with detecting anomaly of samples based on machine learning. An individual sample as considered in the present disclosure is a one-dimensional or multi-dimensional signal, as illustrated as follows. One industrial application of anomaly detection is related to testing manufactured articles. In one practical scenario, an automatic testing machine captures images of manufactured articles and analyzes the images to detect defective items. Hence, the individual sample is a two-dimensional (2D) image. In another scenario, a certain functionality of a manufactured article is tested with a sensor. The individual sample is a one-dimensional (1D) data stream given by a time series of sensor data for measuring an activity done by the article. For instance, the article is a car, the activity is making a brake, and the time series of sensor data gives a deceleration profile of the car. In yet another scenario, a robotic arm is tested for performing a complex motion-based task. The individual sample is a video clip recording motion of the robotic arm during operation. The video clip is a three-dimensional (3D) signal, having three dimensions in width, height and frame number. Similarly, an action of automatically opening a car door can be tested by capturing a video clip of this action.

Disclosed herein is a computer-implemented method for detecting sample anomaly in a plurality of samples. Machine-learning models are used for anomaly detection.

Figure 1:
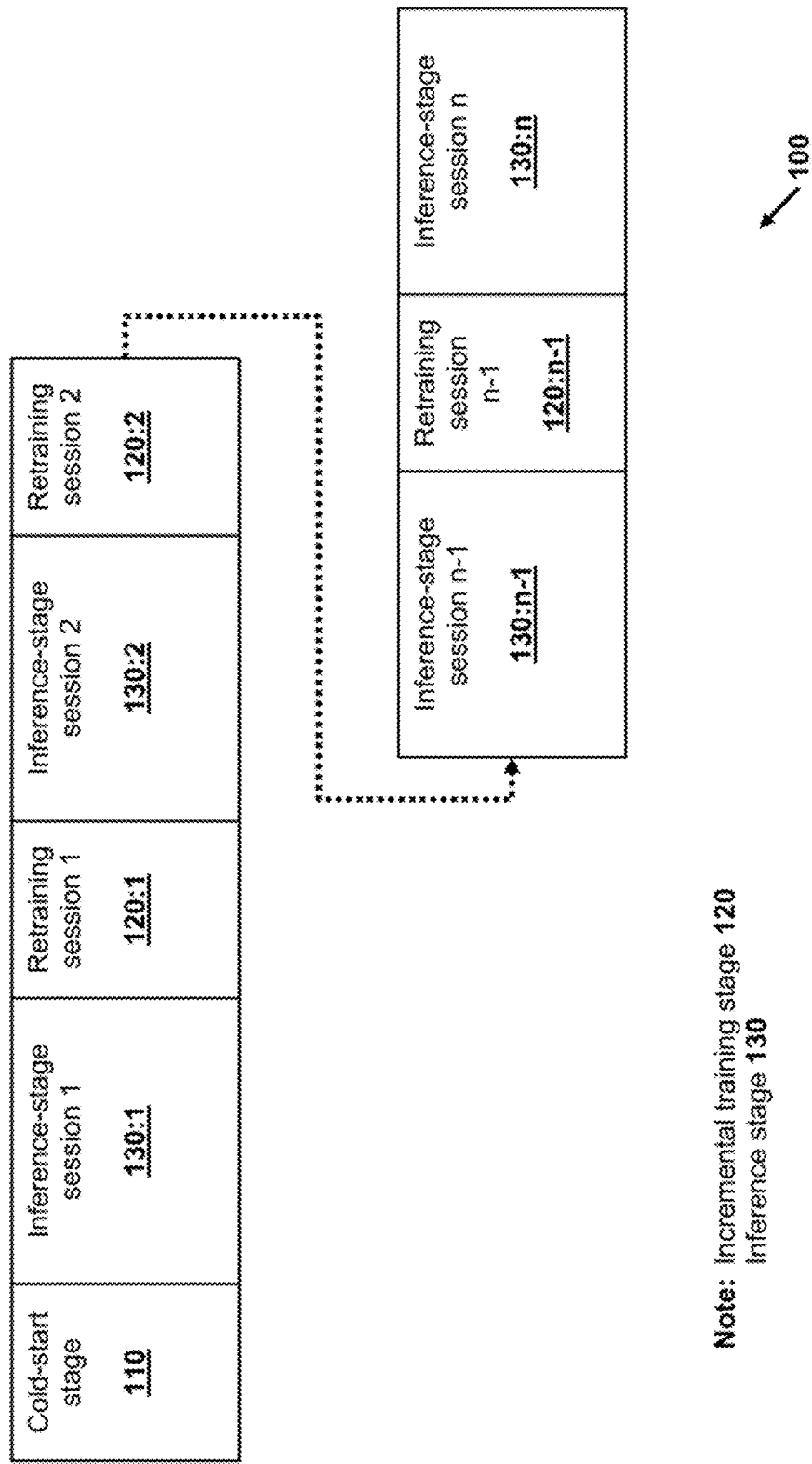
FIG. 1 depicts a flow diagram of a process for detecting sample anomaly in a plurality of samples in accordance with an exemplary embodiment of the disclosed method, where the process is divided into a cold-start stage, an incremental training stage and an inference stage.
Figure 2:
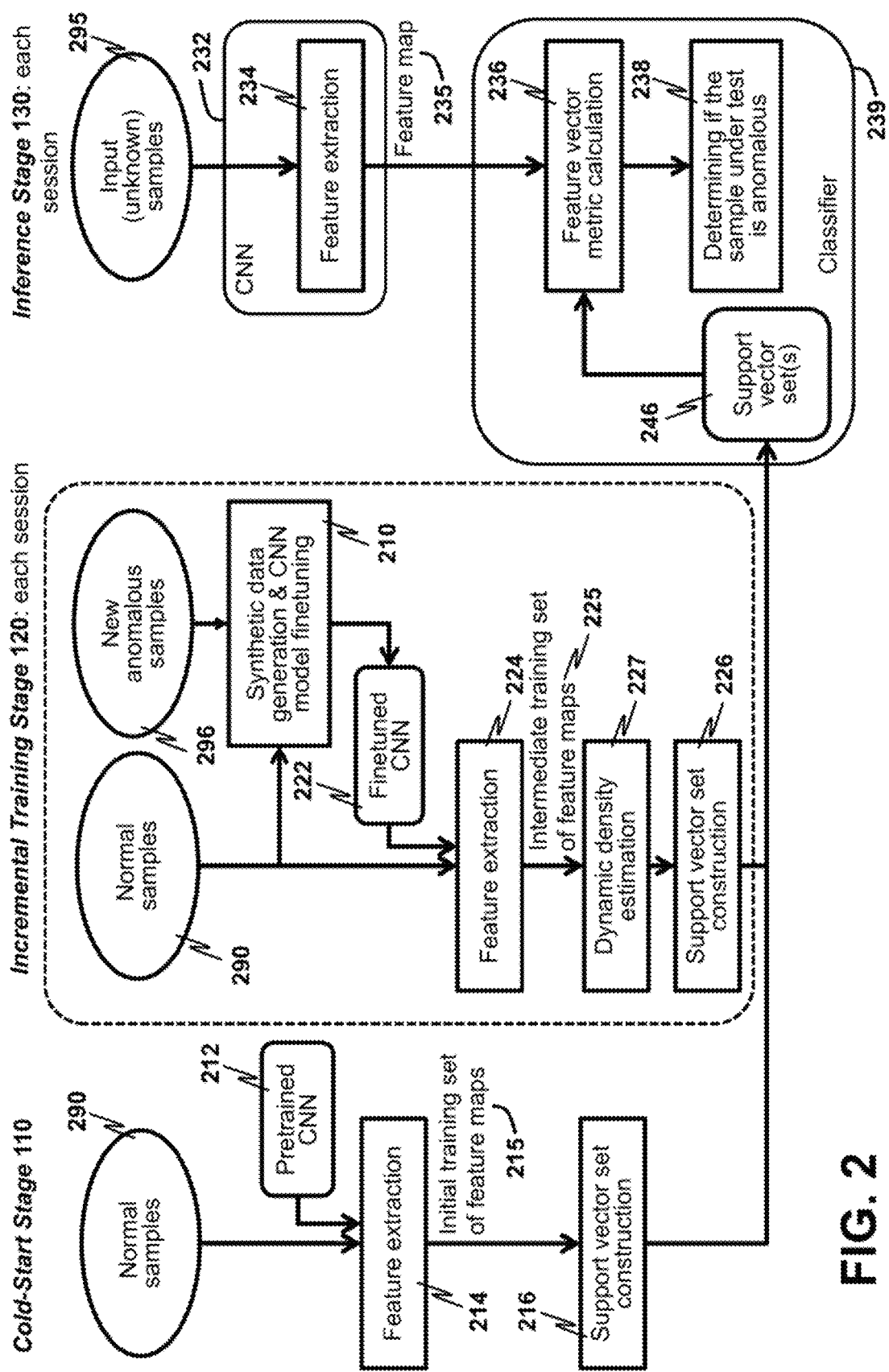
FIG. 2 depicts a schematic diagram of the three stages for illustrating operations performed in and across the three stages.

The method is illustrated with the aid of FIGS. 1 and 2. FIG. 1 depicts a flow diagram of a process 100 used for detecting anomaly of respective samples in a plurality of samples in accordance with an exemplary embodiment of the disclosed method. The process 100 is divided into a cold-start stage 110, an incremental training stage 120 and an inference stage 130. FIG. 2 depicts a schematic diagram of the three stages 110, 120, 130 for illustrating operations performed in and across the three stages 110, 120, 130.

Since machine-learning models are used in the process 100, the plurality of samples (referenced as 295) is processed in the inference stage 130 for anomaly detection. The cold-start stage 110, which precedes the inference stage 130, is an initialization stage for initializing variables used in the process 100 and training the machine-learning models before the inference stage 130 commences. In the process 100, the inference stage 130 is divided into a plurality of inference-stage sessions 130:1-n where n is the number of inference-stage sessions in the inference stage 130. As a result, the processing of the plurality of samples 295 for anomaly detection is distributed over the n inference-stage sessions 130:1-n. The incremental training stage 120 is used for retraining or updating the machine-learning models in order to improve an anomaly-detection performance. The incremental training stage 120 is divided into a plurality of retraining sessions 120:1-(n−1). In the process 100, one retraining session is inserted between two successive inference-stage sessions. For example, the retraining session 120:1 is time-positioned between the two inference-stage sessions 130:1, 130:2. As the inference stage 130 is divided into n interference-stage sessions, there are n−1 retraining sessions.

Since each of the samples 295 is a one- or multi-dimensional signal, a convolution operation is useful to extract features of the signal. In the present disclosure, the signal is processed with a CNN 232 for feature extraction 234.

In the inference stage 130, the CNN 232 is used to extract features of an individual sample selected from the plurality of samples 295 to thereby generate a feature map 235. A machine-learning classifier 239 modelled with one or more support vector sets 246 is then used to process the feature map 235 to determine if the individual sample is anomalous. Each support vector set includes one or more support vectors. Functions of support vector and support vector set can be found in the literature related to clustering. In the classifier 239, feature vector metric calculation 236 is carried out between the feature map 235 and each support vector set to yield one or more distances. The one or more distances are used in the determination 238 of whether the individual sample under test is anomalous. The one or more support vector sets 246 are initially obtained in the cold-start stage 110 and iteratively updated in the incremental training stage 120.

The classifier 239 may adopt an L2 distance as a criterion in classification. Each of the one or more distances calculated in feature vector metric calculation 236 is an L2 distance. The one or more L2 distances as calculated are used in the aforementioned determination 238. Any other distance metric may also be used as the criterion for the classifier 239.

In the cold-start stage 110, the one or more support vector sets 246 are initialized according to an initial training set of feature maps 215. The initial training set of feature maps 215 is generated from processing a set of normal samples 290 with a pretrained CNN 212 where the pretrained CNN 212 is trained for feature extraction 214. Note that the set of normal samples 290 is a training dataset. The CNN 212 is pretrained by loading pre-stored CNN model parameters into the CNN 212.

In an individual retraining session in the incremental training stage 120, the CNN 232 is finetuned by a finetuning procedure 210 (resulting in a finetuned CNN 222) according to at least an interim set of self-generated anomalous samples 296 identified during an inference-stage session immediately preceding the individual retraining session. The one or more support vector sets 246 are then updated according to an intermediate training set of feature maps 225 generated from processing the set of normal samples 290 with the finetuned CNN 222 generated in the individual retraining session.

For illustration, consider an ith retraining session 120:i where 1≤i≤n. A set of anomalous samples identified during the ith inference-stage session 130:i forms the interim set of self-generated anomalous samples 296 to be used in the ith retraining session 120:i. Therefore, the CNN 232 used in the ith inference-stage session 130:i is already trained with training samples obtained from the set of normal samples 290 and a collection of anomalous samples identified from the first to (i−1)th inference-stage sessions 130:1-(i−1) during detecting anomaly for the plurality of samples 295. In the ith retraining session 120:i, the CNN 232 is improved or finetuned by further training with additional anomalous samples newly-identified during the ith inference-stage session 130:i. The finetuned CNN 222 as obtained in the ith retraining session 120:i is then used to perform feature extraction 224 by processing the set of normal samples 290 to generate the intermediate training set of feature maps 225. Note that the set of normal samples 290 used in the ith retraining session 120: i is the same as the one used in the cold-start stage 110 and in the first to (i−1)th retraining sessions 120:1-(i−1). The intermediate training set of feature maps 225 is then used to update the one or more support vector sets 246.

In contrast to the cold-start stage 110, which has only the set of normal samples 290 for training, the incremental training stage 120 updates the CNN 232 with anomalous samples self-generated from checking the plurality of samples 295 for possible anomaly. By this arrangement, it provides training sample variety even though anomalous samples for training are not available in the cold-start stage 110. Advantageously, this arrangement of the incremental training stage 120 allows an anomaly-detection performance to be continually improved due to introducing newly-identified self-generated anomalous samples in incrementally training the CNN 232 and classifier 239 while avoiding a need for seeking an initial training set of anomalous samples for initializing the CNN 232 and classifier 239 in the cold-start stage 110.

Since respective interim sets of self-generated anomalous samples for different retraining sessions are likely to have different and variable numbers of anomalous samples, it is generally not simple to develop the finetuning procedure 210 that is efficient and that achieves a good training performance. In the finetuning procedure 210, preferably the CNN 232 is finetuned according to the set of normal samples 290 and the interim set of self-generated anomalous samples 296 instead of the latter set alone. In particular, the set of normal samples 290 is augmented with the interim set of self-generated anomalous samples 296 by a copy-paste augmentation technique to create synthetic training data. In the copy-paste augmentation technique, selected anomalous portions of respective anomalous samples in the interim set of self-generated anomalous samples 296 are copied onto one or more normal samples in the set of normal samples 290, thereby creating a set of synthetic training samples for enriching training set variety in finetuning the CNN 232.

Figure 3:
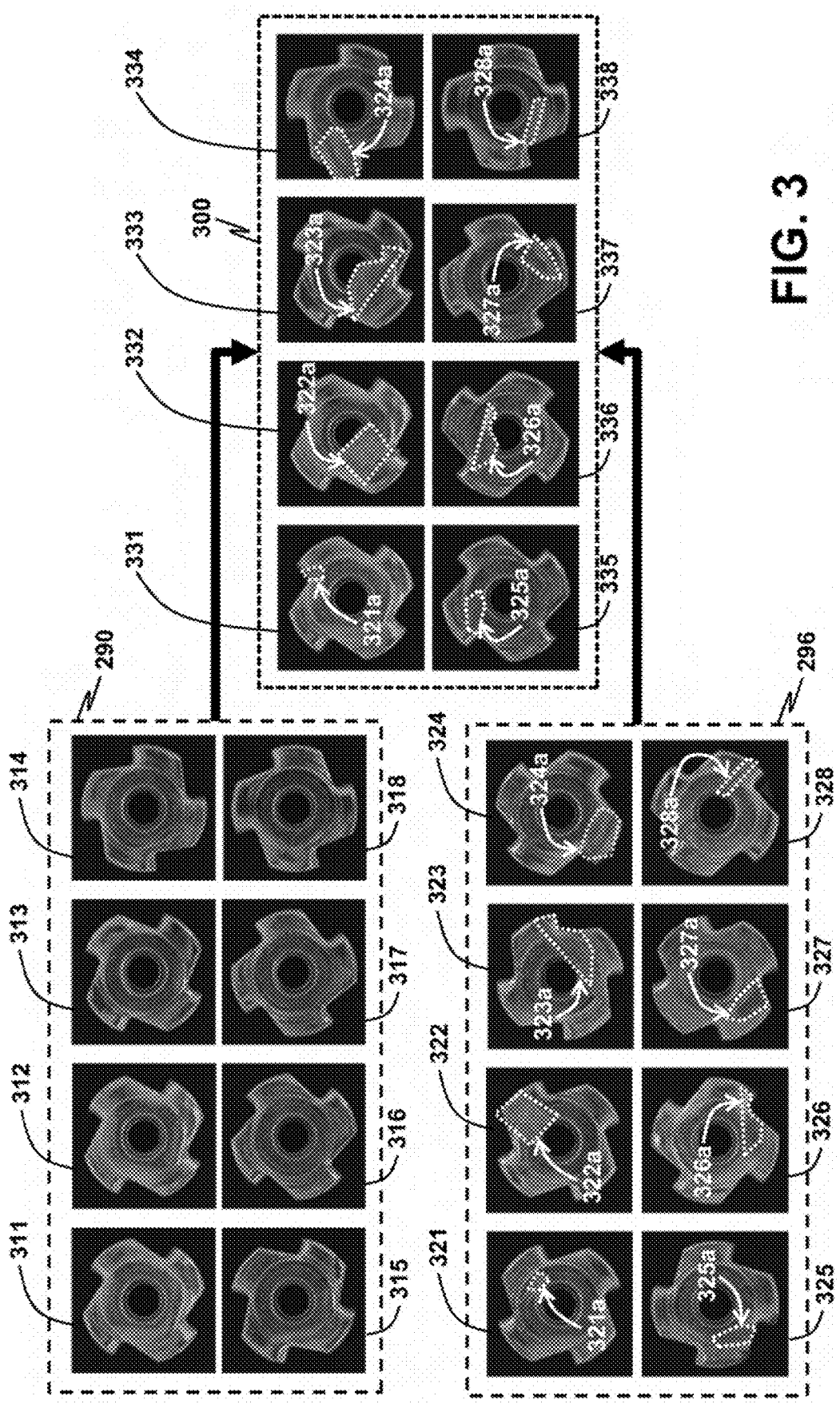
FIG. 3 provides an illustrative example of a copy-paste augmentation technique in creating a set of synthetic training samples from a set of normal samples and an interim set of self-generated anomalous samples.

FIG. 3 provides an illustrative example of creating a set of synthetic training samples 300 from the set of normal samples 290 and the interim set of self-generated anomalous samples 296 by the copy-paste augmentation technique. The set of normal samples 290 has eight normal samples 311-318. The set of synthetic training samples 300 has eight samples 331-338. The interim set of self-generated anomalous samples 296 has eight anomalous samples 321-328. Respective portions 321a, 322a, 323a, 324a, 325a, 326a, 327a and 328a of the anomalous samples 321-328 having abnormality are selected, copied and then pasted onto corresponding normal samples 311-318 to form synthetic training samples 331-338, respectively, in the set of synthetic training samples 300.

After the set of synthetic training samples is prepared, preferably and advantageously model parameters of the CNN 232 are updated according to the set of synthetic training samples. In particular, the model parameters are updated by performing multiple iterations of optimizing the model parameters to minimize a loss function in each iteration and by using a center loss and a diversity loss alternately and recursively as the loss function over the iterations of model parameter optimization. The purpose of using the center loss in model-parameter optimization is to increase similarity of feature maps obtained for different normal samples. Let C be a center of a normal image. The center loss, $L_C$, is given by $$L_C = \frac{1}{2}\sum_{i=1}^{m}\delta(y_i = 0)\|x_i - C\|^2 \quad (1)$$

where: $y_i=0$ means instance i belongs to an abnormal case; $\delta(s)=1$ if s is true, and $\delta(s)=0$ otherwise; and m is the number of synthetic training samples in the set of synthetic training samples. The purpose of using the diversity loss in model-parameter optimization is to increase difference between a normal case and an abnormal case. The diversity loss, $L_D$, is given by $$L_D = \frac{1}{2}\sum_{i=1}^{m}\delta(y_i = 1)\|x_i - C\|^2 \qquad (2)$$

where $y_i=1$ means instance i belongs to a normal case. Note that C is updated in every instance of optimization. By the aforementioned arrangement in loss-function selection for model-parameter optimization, it advantageously enables the finetuned CNN 222 to be more effective in detecting fine-grained defects. The number of iterations of model-parameter optimization may be selected to be 2, 4, or an even number considered appropriate by those skilled in the art according to a practical situation under consideration. It is also possible that the number of iterations is selected to be an odd number greater than one.

Figure 4:
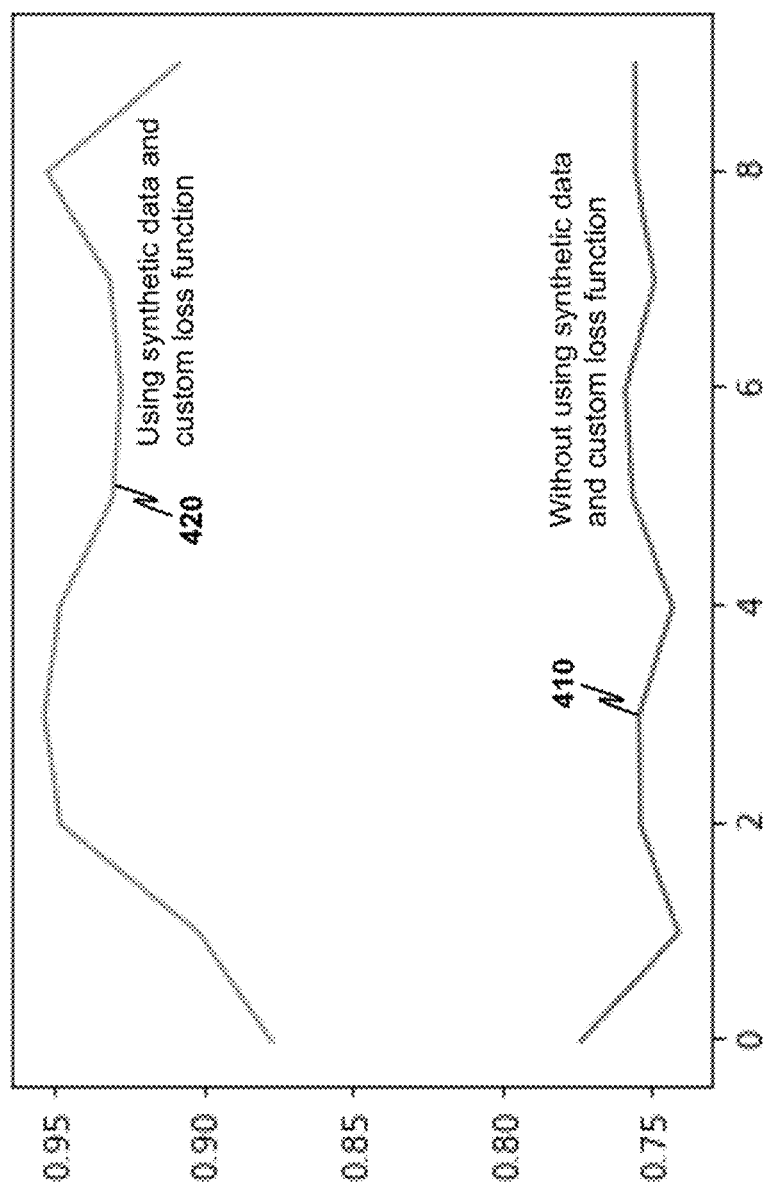
FIG. 4 provides a performance comparison between a disclosed finetuning procedure of using synthetic data and custom loss in CNN training and a conventional training procedure without using the synthetic data and custom loss.

FIG. 4 provides a performance comparison between the finetuning procedure 210 of using the synthetic data and custom loss (viz., using the center loss and diversity loss alternately and recursively) as disclosed herein and a conventional training procedure without using the synthetic data and custom loss. Performances of the finetuning procedure 210 and of the conventional training procedure are plotted in curves 420 and 410, respectively. It is apparent that the finetuning procedure 210 outperforms the conventional training procedure.

As mentioned above, determination of the one or more support vector sets 246 is required in both the cold-start stage 110 and the incremental training stage 120. In the cold-start stage, the one or more support vector sets 246 are initialized by a first construction operation 216 according to the initial training set of feature maps 215. In the individual retraining session, the one or more support vector sets 246 are updated by a second construction operation 226 according to the intermediate training set of feature maps 225. The first and second construction operations 216, 226 are elaborated as follows.

The first and second construction operations 216, 226 may be realized according to a technique known in the art for selecting appropriate support vectors based on the initial training set of feature maps 215 and the intermediate training set of feature maps 225, respectively.

The first construction operation 216 may be realized by first generating a first plurality of feature k-centers from extracted features in the initial training set of feature maps, and then selecting respective support vectors in the one or more support vector sets 246 from the first plurality of feature k-centers. The first plurality of feature k-centers may be obtained from the extracted features by using a k-center algorithm known in the art. The k-center algorithm may be a greedy k-center algorithm.

The second construction operation 226 may be realized by the same approach of realizing the first construction operation 216. That is, the one or more support vector sets 246 are determined directly from the intermediate training set of feature maps 225 by using a k-center algorithm. However, the required computation effort can be advantageously reduced if a knowledge of existing support vectors is utilized in updating the one or more support vector sets 246 from the intermediate training set of feature maps 225. Based on this approach, advantageously an operation 227 of dynamic density estimation for selecting feature k-centers dynamically to represent normal data is carried out before the second construction operation 226 is performed.

Figure 5:
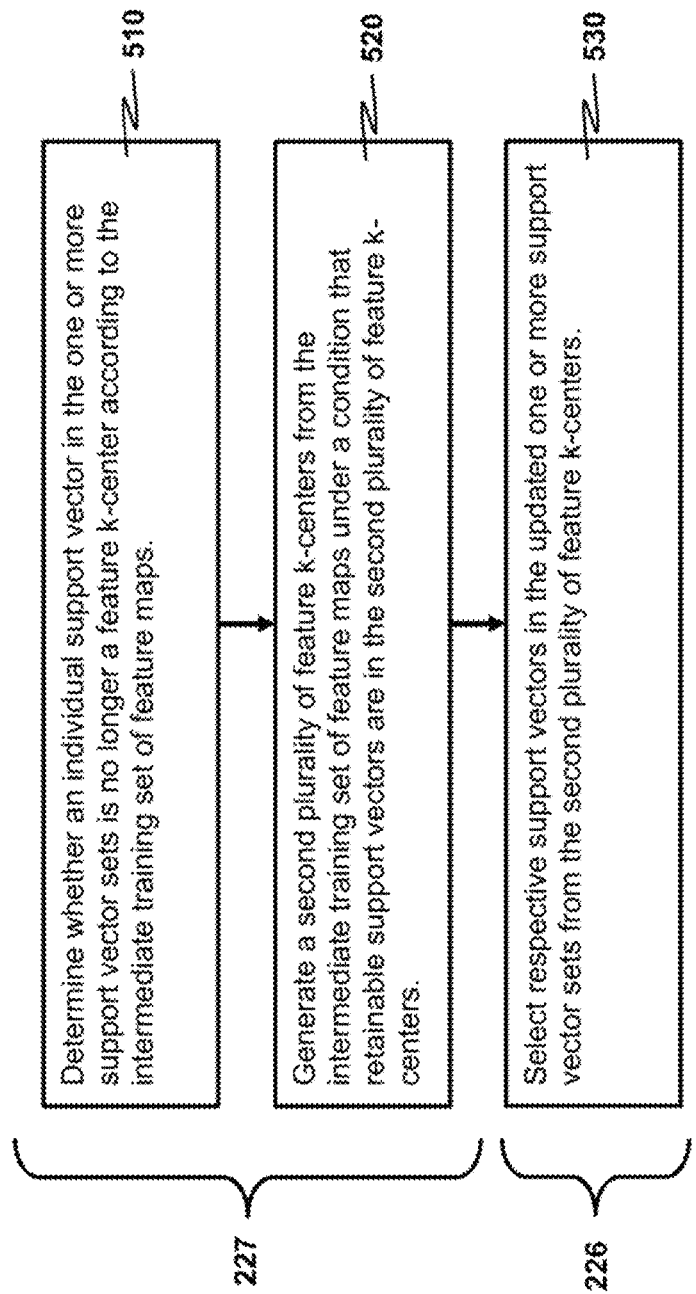
FIG. 5 depicts a flowchart showing exemplary steps used in a dynamic density estimation operation and a second construction operation both executed in a retraining session of the incremental training stage.

FIG. 5 depicts a flowchart showing exemplary steps used in the dynamic density estimation operation 227 and the second construction operation 226 in the ith retraining session 120:i. In the beginning of the ith retraining session 120:i, the one or more support vector sets 246 used in the ith inference-stage session 130:i are available. These one or more support vector sets 246 are denoted as the current one or more support vector sets 246 for clarity. The dynamic density estimation operation 227 comprises steps 510 and 520. The second construction operation comprises step 530.

The step 510 determines whether an individual support vector in the current one or more support vector sets 246 is no longer a feature k-center according to the intermediate training set of feature maps 225. An original feature k-center in the previous one or more support vector sets generated in the (i−1)th retraining session 120:(i−1) may not be a k-center for the intermediate training set of feature maps 225 obtained in the ith retraining session 120:i due to a change in feature maps. As a result, respective support vectors in the current one or more support vector sets 246 are divided into retainable support vectors and discardable support vectors for updating the one or more support vector sets 246. For convenience, the one or more support vector sets 246 after updating are denoted as the updated one or more support vector sets 246.

The step 520 generates a second plurality of feature k-centers from extracted features in the intermediate training set of feature maps 225 under a condition that the retainable support vectors are in the second plurality of feature k-centers. As the retainable support vectors are known, it is only necessary to compute remaining feature k-centers in the second plurality of feature k-centers. Thereby, it reduces required computation effort in comparison to generating the second plurality of feature k-centers from scratch. In certain embodiments, the second plurality of feature k-centers is obtained by using a greedy k-center algorithm.

In the step 530, respective support vectors to be included in the updated one or more support vector sets 246 are selected from the second plurality of feature k-centers. Preferably, all respective feature k-centers in the second plurality of feature k-centers are used as the respective support vectors such that all the respective feature k-centers are fully utilized to avoid wasting of computation effort in computing the second plurality of feature k-centers.

Practically, the disclosed method is particularly useful in the industry for identifying any defective article from an image file containing one or more articles under test. Various embodiments of the disclosed method can be developed for this industrial application.

In this application, the individual sample in the plurality of samples 295 for anomaly detection is an image, and the CNN 232 is implemented with a two-dimensional convolution operation.

Optionally, an individual anomalous sample in the set of anomalous samples 296 is pixelwise labelled manually for increasing CNN model accuracy in retraining the CNN 232. Under such circumstance, an individual synthetic training sample in the set of synthetic training samples is also pixelwise labelled automatically. In the finetuning procedure 210, the process 100 first receives the set of anomalous samples 296 in which the individual anomalous sample is pixelwise labelled. The received set of pixelwise-labelled anomalous samples is used to obtain the finetuned CNN 222. In addition to using the set of pixelwise-labelled anomalous samples, the set of normal samples 290 may also be (manually) labelled for enhancing CNN model accuracy in obtaining the finetuned CNN 222.

The first and second construction operations 216, 226 for constructing the one or more support vector sets 246 may be designed for the aforementioned industrial application of defective article identification from 2D images with an additional advantage of adapting the disclosed method to practical implementation under certain detection-speed requirements and computer-memory constraints. The main idea is to arrange the one or more support vector sets 246 as a single support vector set or a plurality of support vector sets.

Figure 6:
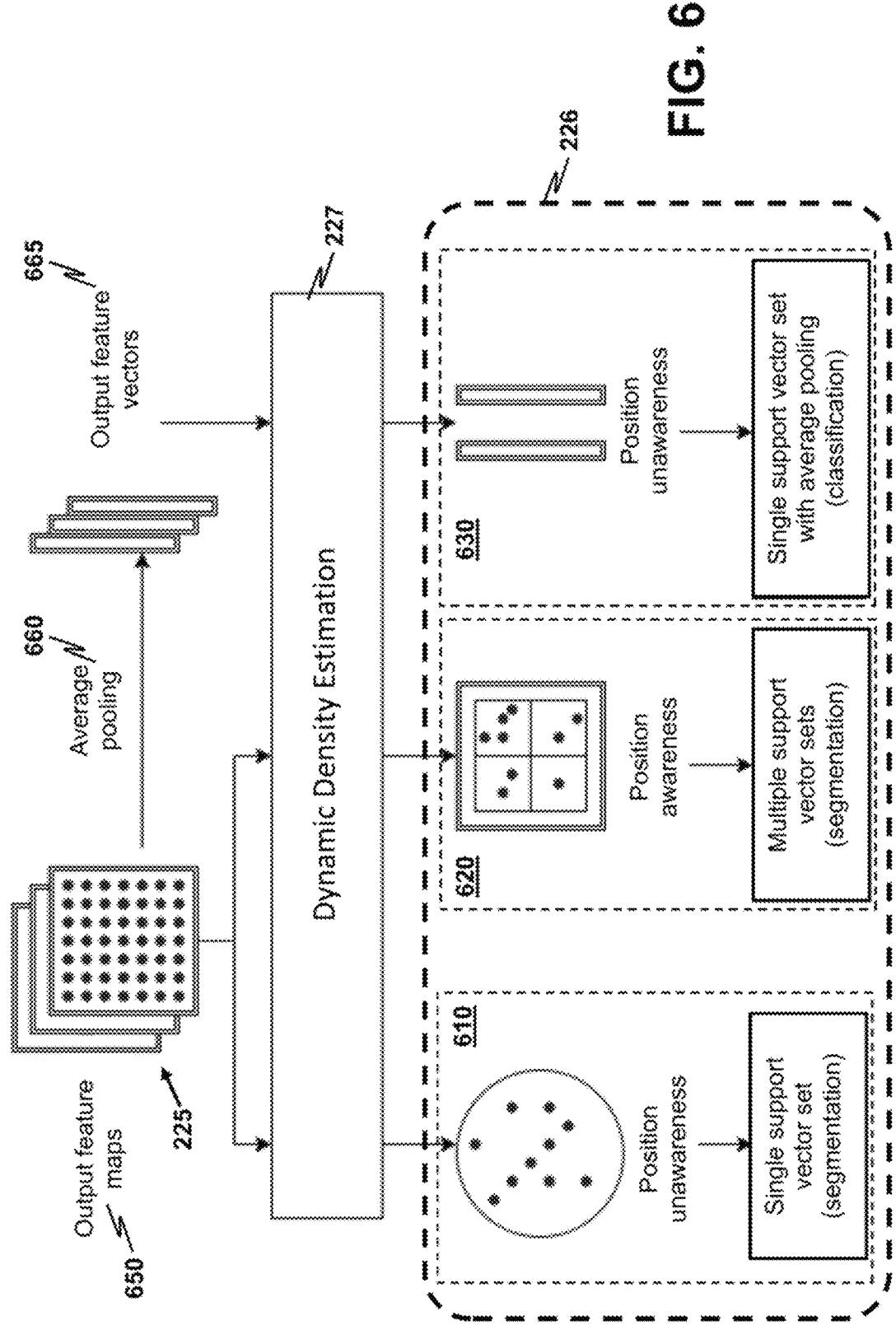
FIG. 6 depicts a conceptual diagram showing three arrangements of one or more support vector sets for achieving different detection-speed requirements under different computer-memory constraints.

FIG. 6 depicts a conceptual diagram about three arrangements of the one or more support vector sets 246 for achieving different detection-speed requirements under different computer-memory constraints, where the three arrangements form different bases in designing the second construction operation 226. The design of the first construction operation 216 is similar. Those skilled in the art will appreciate that the first construction operation 216 can be designed according to the teaching related to the second construction operation 226 as disclosed herein.

In a first arrangement 610, the one or more support vector sets 246 consist of a single support vector set such that all respective support vectors in the one or more support vector sets 246 are collected in the single support vector set. As a result, the Euclidean transformation of an input image does not affect an output result. As rotation of the input image does not affect the output result, classification can be carried out by the classifier 229 without a need for article(s) under test in the input image to be aligned with a certain reference frame. It allows "position unawareness" of the article(s) in preparing the input image. The disclosed method that uses the first arrangement 610 can produce segmentation results and provide locations on the input image where anomaly occurs. Thus, the disclosed method provides information on: which one of articles imaged in the sample under test is defective if the sample under test contains multiple articles; or which specific part(s) of an article are defective if the sample under test contains a single article. It follows that the disclosed method produces segmentation results as well as classification results over the input image (namely, the sample under test).

In a second arrangement 620, the one or more support vector sets 246 consist of multiple support vector sets. An individual support vector set collects respective support vectors located on a preselected region of the feature map. This preselected region has a corresponding region on an input image used as the sample under test. In addition, respective preselected regions for the multiple support vector sets are non-overlapping such that the multiple support vector sets are disjoint. As a result, the Euclidean transformation on the input sample has crucial influence on the output result. As rotation of the input image affects the output result, article(s) under test in the input image are required to be aligned with a certain reference frame in order to obtain a good classification performance. In preparing the input image, it requires "position awareness" of the article (s). The disclosed method that uses the second arrangement 620 can produce segmentation results and provide locations on the input image where anomaly occurs. Furthermore, the disclosed method provides faster training and a high inference speed. However, a drawback of the second arrangement 620 is that a larger memory is required in storing the multiple support vector sets. Note that in response to using the second arrangement 620 in the incremental training stage 120 and the cold-start stage 110, the inference stage 130 is further arranged to process the feature map with each of the multiple support vector sets for determining any location on the individual sample where anomaly occurs.

In a third arrangement 630, the one or more support vector sets 246 consist of a single support vector set. In addition, support vectors in the single support vector set are features in 1D vector form after average pooling. The feature in 1D vector form are obtained by first processing output feature maps 650 in the intermediate training set of feature maps 225 with average pooling 660 to form output feature vectors 665, and then processing the output feature vectors 665 with dynamic density estimation 227 to yield feature k-centers that are vectors. The disclosed method that uses the third arrangement 630 can only provide a classification result of whether the sample under test as a whole is anomalous or not, and it does not provide any segmentation result. On the other hand, the disclosed method is super-fast in retraining (the incremental training stage 120) and in making inference (the inference stage 130) due to using feature vectors instead of feature maps. Note that to realize the third arrangement 630, the CNN 232 is designed to include an averaging pooling layer such that the feature map 235 is reduced to a feature vector. Also note that similar to the first arrangement 610, which employs a single support vector set, using the third arrangement 630 allows "position unawareness" of the article(s) in preparing the input image.

Experimental results were obtained for comparing the first, second and third arrangements 610, 620, 630. Table 1 provides a performance comparison in inference speed (namely, detection speed) and retraining speed among the first, second and third arrangements 610, 620, 630. It is apparent that the third arrangement 630 is extremely fast in retraining and inference, and that the second arrangement 620 can achieve a better performance in inference speed and retraining speed.

TABLE 1

| | Time taken for constructing support vector sets in retraining | Inference speed |
|---|---|---|
| Single support vector set (1st arrangement) | 230.18 s | 15.04 images/s |
| Multiple support vector sets (2nd arrangement) | 143.2 s | 17.89 images/s |
| Single support vector set with averaging pooling (3rd arrangement) | 0.11 s | 104.08 images/s |

Experiments were conducted for comparing the disclosed method and a supervised baseline model (based on U.S. Pat. No. 9,964,607B1 and CN110555467A) in anomaly-detection performance. Table 2 lists values of area under receiver operating characteristic curve (AUC-ROC) as performance measurement metrics for the disclosed method and the supervised baseline model. Since incremental training is used in the disclosed method, the AUC-ROC values were measured at four selected time instants: (1) end of the cold-start stage 110; and (2) ends of the first to third retraining sessions 120:1-3. In the experiments, 300 normal samples were used in the cold-start stage 110 as training data; and additional 100, 200 and 300 defect images were respectively added as training data in the first, second and third retraining session 120:1-3, respectively. In particular, the additional defect images were first passed to the disclosed method and the supervised baseline models for inference. The newly-identified defect images were used by the disclosed method for incremental training. On the other hand, the supervised baseline model was trained at the cold-start stage, but the training data used in training the supervised baseline model were synthetic training data augmenting normal and anomalous images. Center loss and diversity loss were used as loss functions in training the supervised baseline model. From Table 2, it is apparent that given more anomalous images as training data, the performance of the disclosed method improves gradually. In contrast, the performance of the supervised baseline model gradually deteriorates. The comparison results demonstrate that the disclosed method makes an improvement over the supervised baseline model.

TABLE 2

|  | Disclosed method | | | Super-vised baseline |
| --- | --- | --- | --- | --- |
|  | First arrangement | Second arrangement | Third arrangement | |
| AUC-ROC at cold-start stage | 0.805 | 0.812 | 0.794 | NA |
| AUC-ROC at 1st retraining session | 0.917 | 0.923 | 0.968 | 0.8065 |
| AUC-ROC at $2^{nd}$ retraining session | 0.943 | 0.947 | 0.958 | 0.8916 |
| AUC-ROC at $3^{rd}$ retraining session | 0.945 | 0.955 | 0.96 | 0.907 |
| Detection speed (instances/s) | 15.04 | 17.89 | 104.08 | 17.72 |

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for testing a plurality of manufactured articles to determine whether an individual manufactured article is a defective item, the method comprising:

generating a plurality of samples from the plurality of manufactured articles, wherein in the plurality of samples, a corresponding sample generated from the individual manufactured article is a one-dimensional or multi-dimensional signal obtained from sensing the individual manufactured article; and executing a computer-implemented process of detecting sample anomaly in the plurality of samples, wherein if the corresponding sample is determined to be anomalous, the individual manufactured article is determined to the defective item, and wherein the computer-implemented process comprises:

processing the plurality of samples for anomaly detection in an inference stage, inserting a cold-start stage preceding the inference stage, dividing the inference stage into a plurality of inference-stage sessions, and inserting a retraining session between any two successive inference-stage sessions;

in the inference stage, using a convolutional neural network (CNN) to extract features of an individual sample of the plurality of samples to thereby generate a feature map, and using a machine-learning classifier modelled with one or more support vector sets to process the feature map to determine if the individual sample is anomalous;

in the cold-start stage, initializing the one or more support vector sets according to an initial training set of feature maps generated from processing a set of normal samples with the CNN after the CNN is pretrained; and in the retraining session, finetuning the CNN according to at least an interim set of self-generated anomalous samples identified during an inference-stage session immediately preceding the retraining session, and updating the one or more support vector sets according to an intermediate training set of feature maps generated from processing the set of normal samples with the CNN after the CNN is finetuned, thereby allowing an anomaly-detection performance to be continually improved due to introducing newly-identified self-generated anomalous samples in incrementally training the CNN and classifier while avoiding a need for seeking an initial training set of anomalous samples for initializing the CNN and classifier in the cold-start stage.

2. The method of claim 1, wherein the computer-implemented process further comprises:

in the cold-start stage, generating a first plurality of feature k-centers from extracted features in the initial training set of feature maps, and selecting respective support vectors in the initialized one or more support vector sets from the first plurality of feature k-centers; and in the retraining session:

determining whether an individual support vector in the one or more support vector sets is no longer a feature k-center according to the intermediate training set of feature maps, whereby respective support vectors in the one or more support vector sets are divided into retainable support vectors and discardable support vectors for updating the one or more support vector sets;

generating a second plurality of feature k-centers from extracted features in the intermediate training set of feature maps under a condition that the retainable support vectors are in the second plurality of feature k-centers, thereby reducing computation effort in comparison to generating the second plurality of feature k-centers from scratch; and selecting respective support vectors in the updated one or more support vector sets from the second plurality of feature k-centers.

3. The method of claim 2, wherein each of the first and second pluralities of feature k-centers is obtained by using a greedy k-center algorithm.

4. The method of claim 2, wherein the one or more support vector sets consist of multiple support vector sets, an individual support vector set collecting respective support vectors located on a preselected region of the feature map, respective preselected regions for the multiple support vector sets being non-overlapping, and wherein the computer-implemented process further comprises:

in the inference stage, processing the feature map with each of the multiple support vector sets for determining any location on the individual sample where anomaly occurs.

5. The method of claim 2, wherein the one or more support vector sets consist of a single support vector set.

6. The method of claim 2, wherein:

the CNN includes an averaging pooling layer such that the feature map is reduced to a feature vector; and the one or more support vector sets consist of a single support vector set.

7. The method of claim 1, wherein the computer-implemented process further comprises:
in the cold-start stage, loading pre-stored CNN model parameters into the CNN for pretraining the CNN.

8. The method of claim 1, wherein in the retraining session, the finetuning of the CNN comprises:
augmenting the set of normal samples with the interim set of self-generated anomalous samples by copying selected anomalous portions of respective anomalous samples in the interim set of self-generated anomalous samples onto one or more normal samples in the set of normal samples, thereby creating a set of synthetic training samples for enriching training set variety in finetuning the CNN; and
updating model parameters of the CNN according to the set of synthetic training samples by performing multiple iterations of optimizing the model parameters to minimize a loss function in each iteration and by using a center loss and a diversity loss alternately and recursively as the loss function over the iterations of model parameter optimization.

9. The method of claim 1, wherein the individual sample is an image, and the CNN is implemented with a two-dimensional convolution operation.

10. The method of claim 1, wherein the individual sample is an image, and wherein the finetuning of the CNN further comprises receiving the interim set of self-generated anomalous samples in which an individual anomalous sample is pixelwise labelled for increasing CNN model accuracy in retraining the CNN.

11. The method of claim 1, wherein the classifier adopts an L2 distance as a criterion in classification.

12. The method of claim 1, wherein the corresponding sample generated from the individual manufactured article is a two-dimensional (2D) image of the individual manufactured article.

13. The method of claim 1, wherein the corresponding sample generated from the individual manufactured article is a one-dimensional (1D) data stream given by a time series of sensor data for measuring an activity done by the individual manufactured article.

14. The method of claim 13, wherein the individual manufactured article is a car.

15. The method of claim 1, wherein the corresponding sample generated from the individual manufactured article is a video clip recording motion of the individual manufactured article during operation.

16. The method of claim 15, wherein the individual manufactured article is a robotic arm.

* * * * *